Patented Apr. 10, 1934

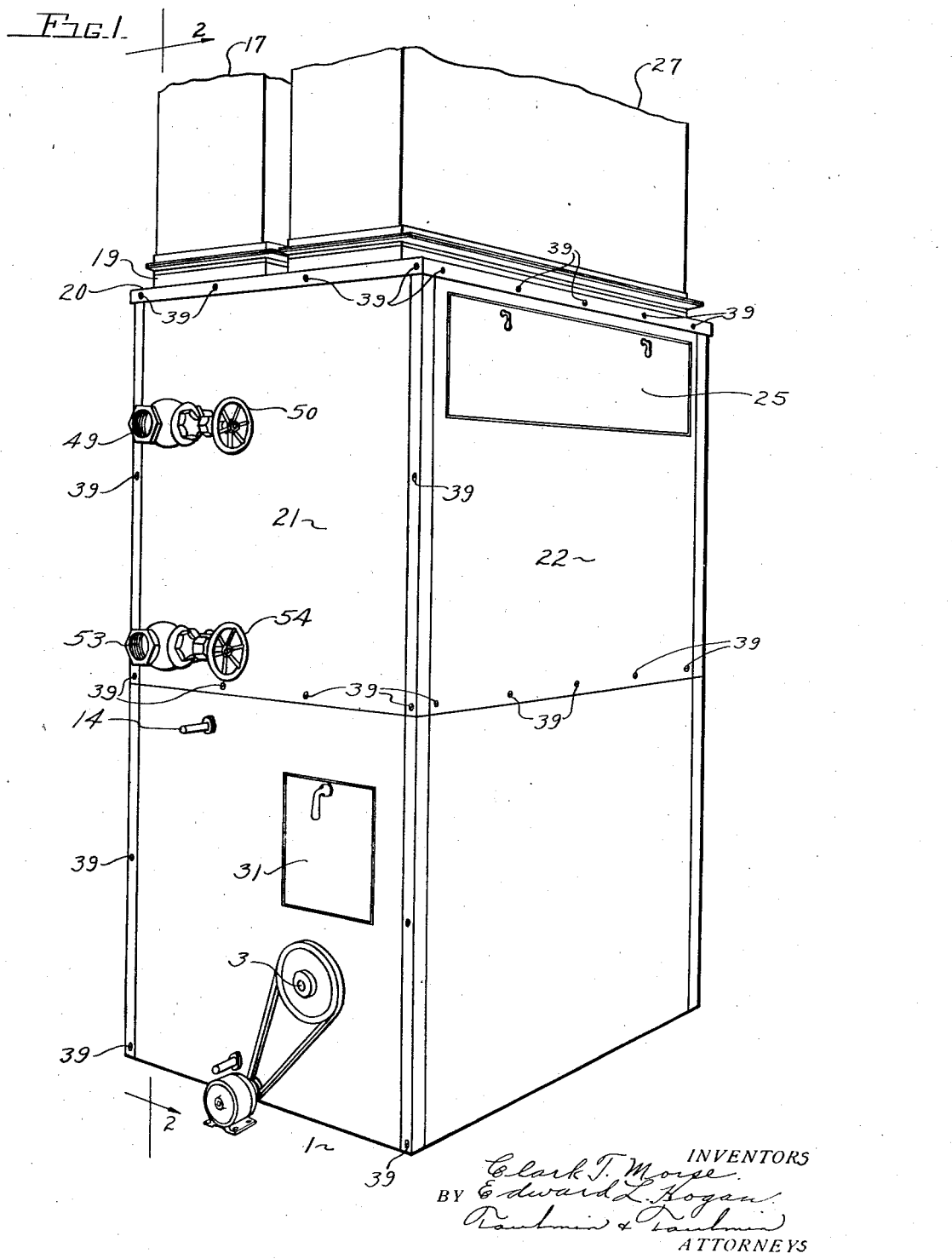

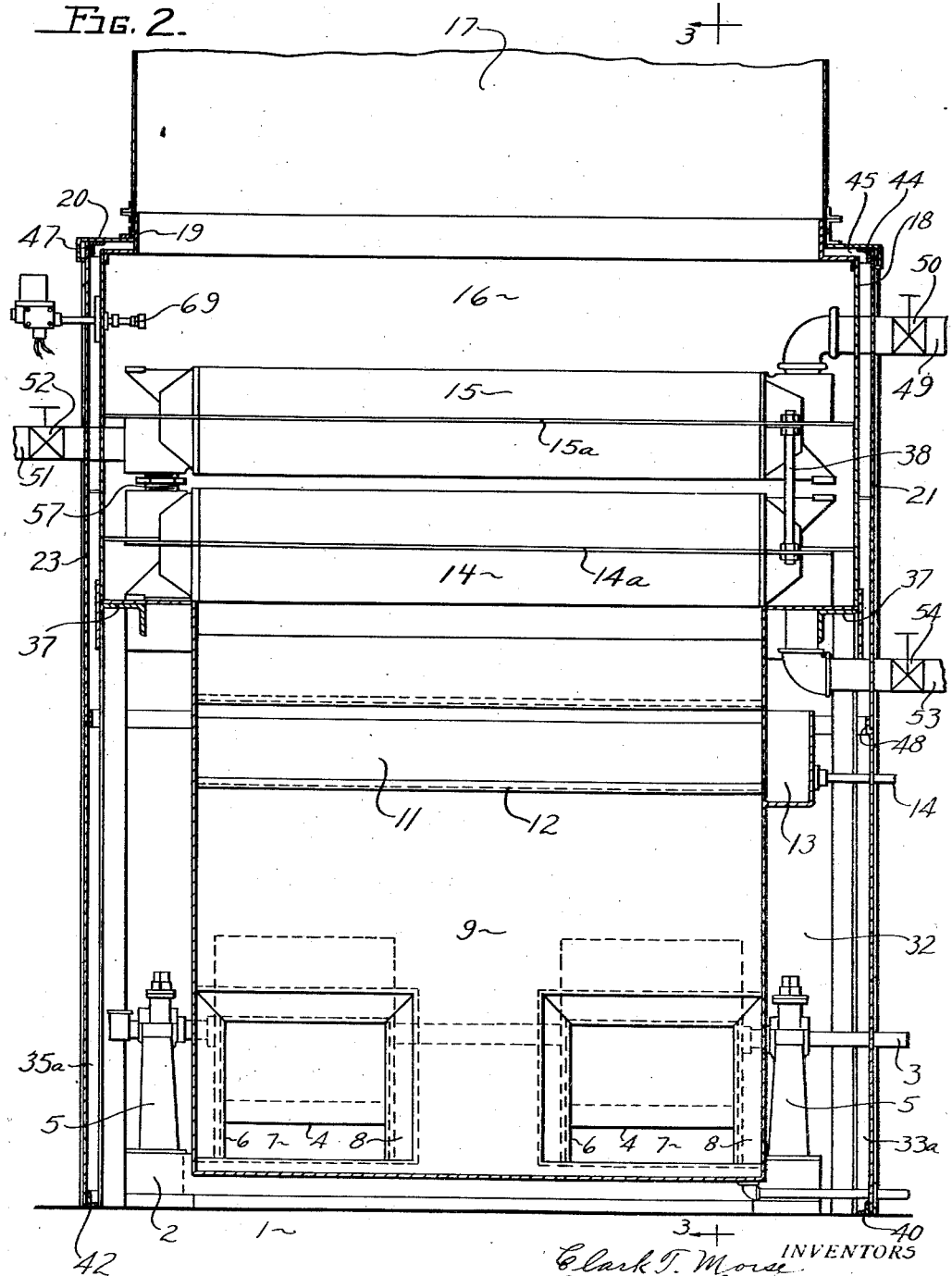

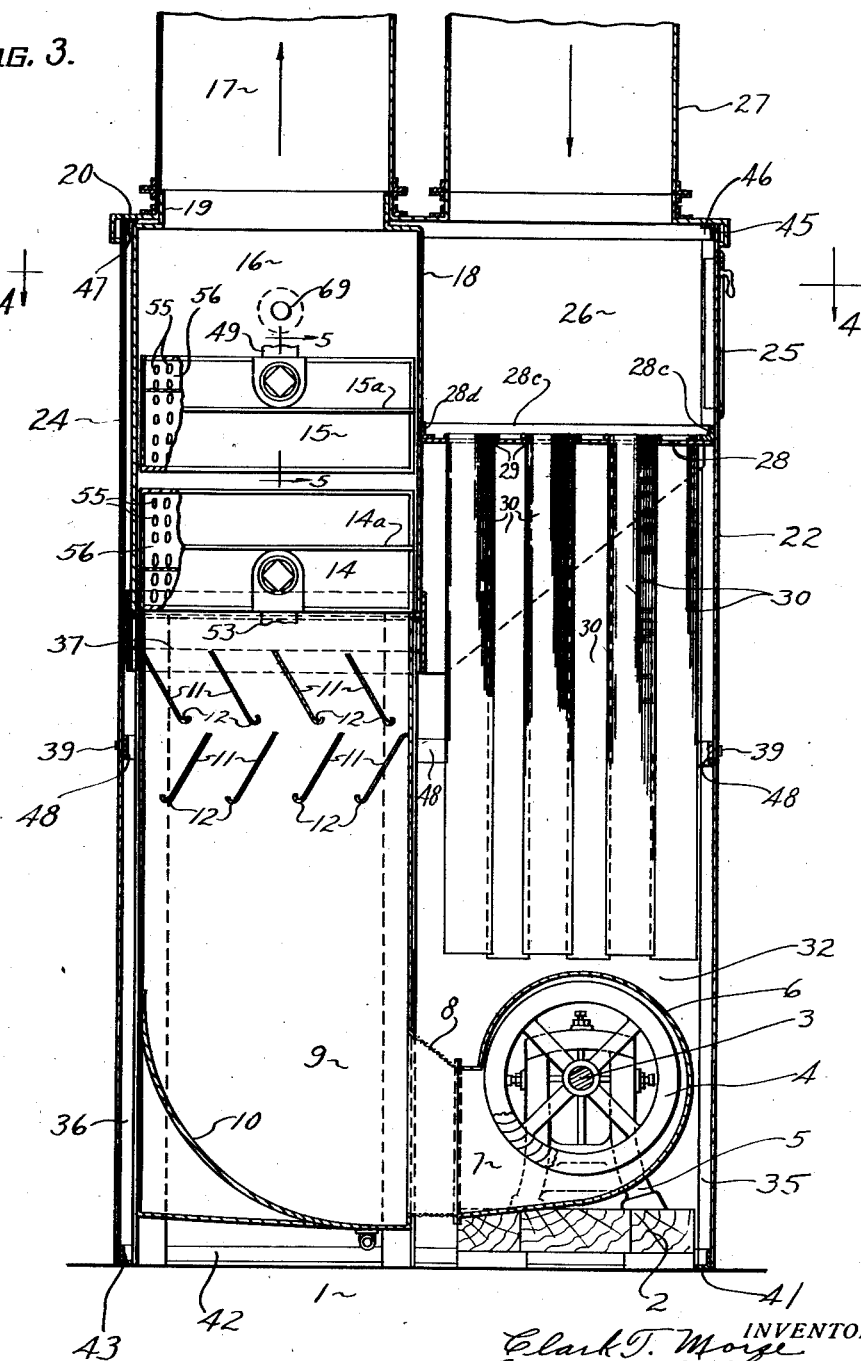

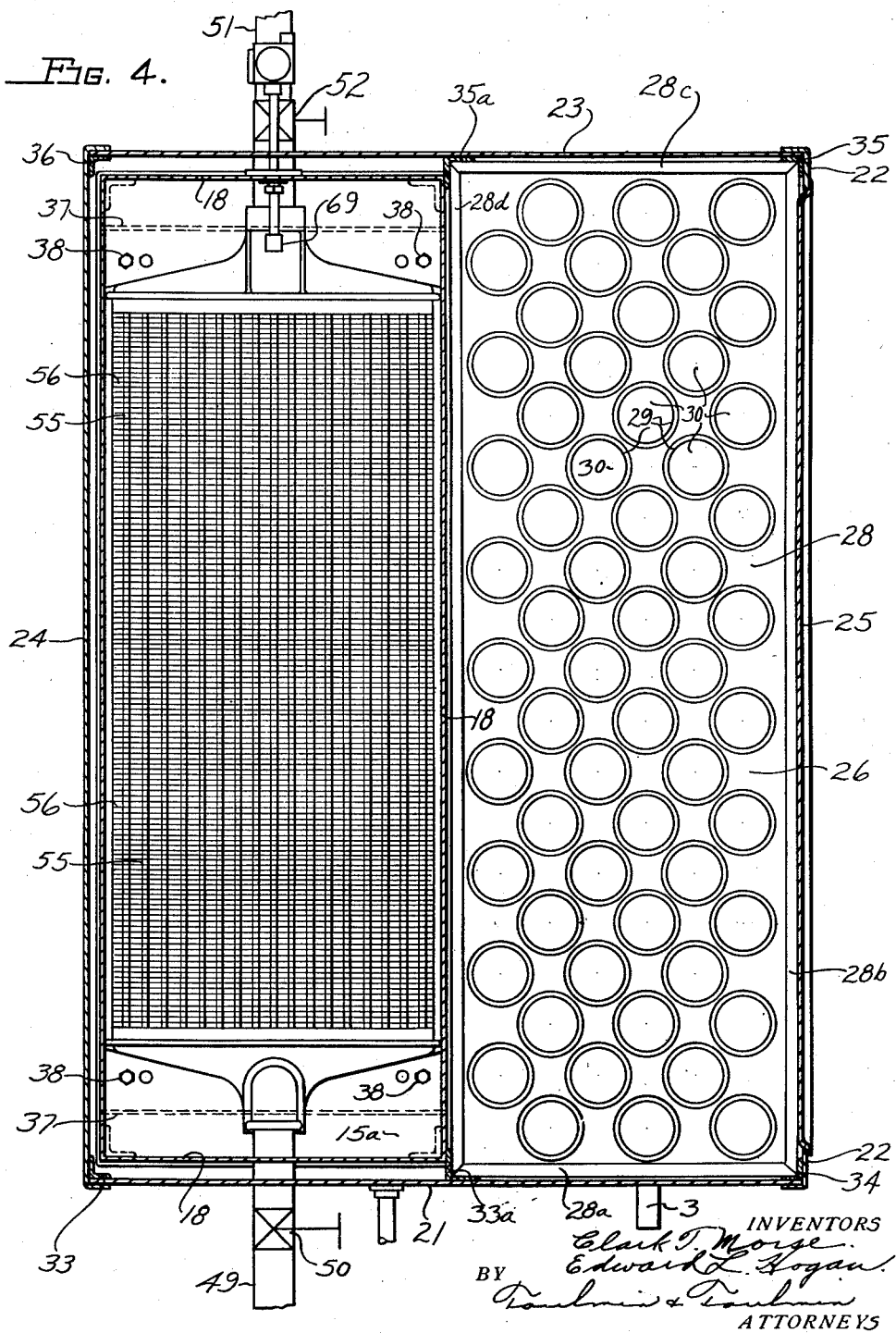

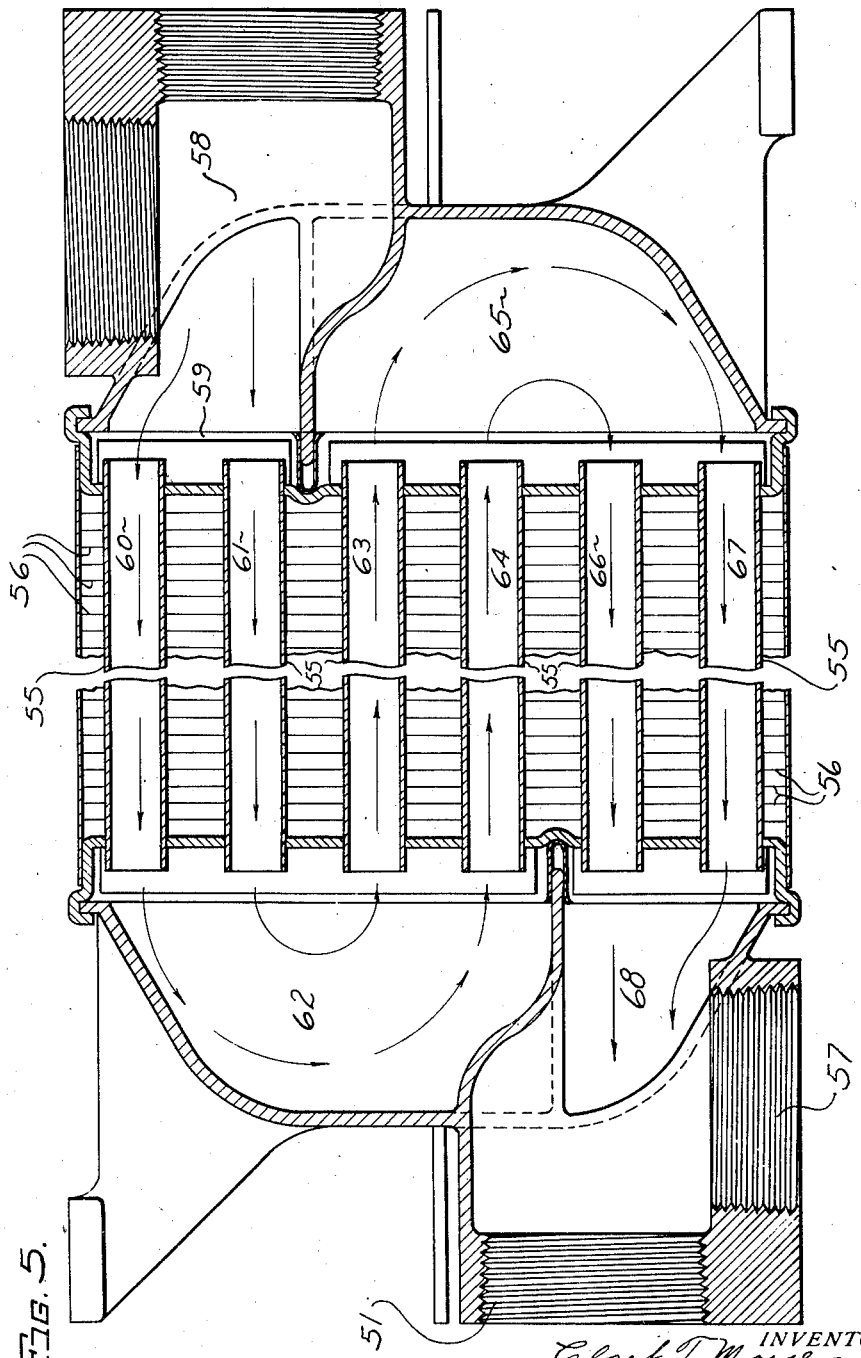

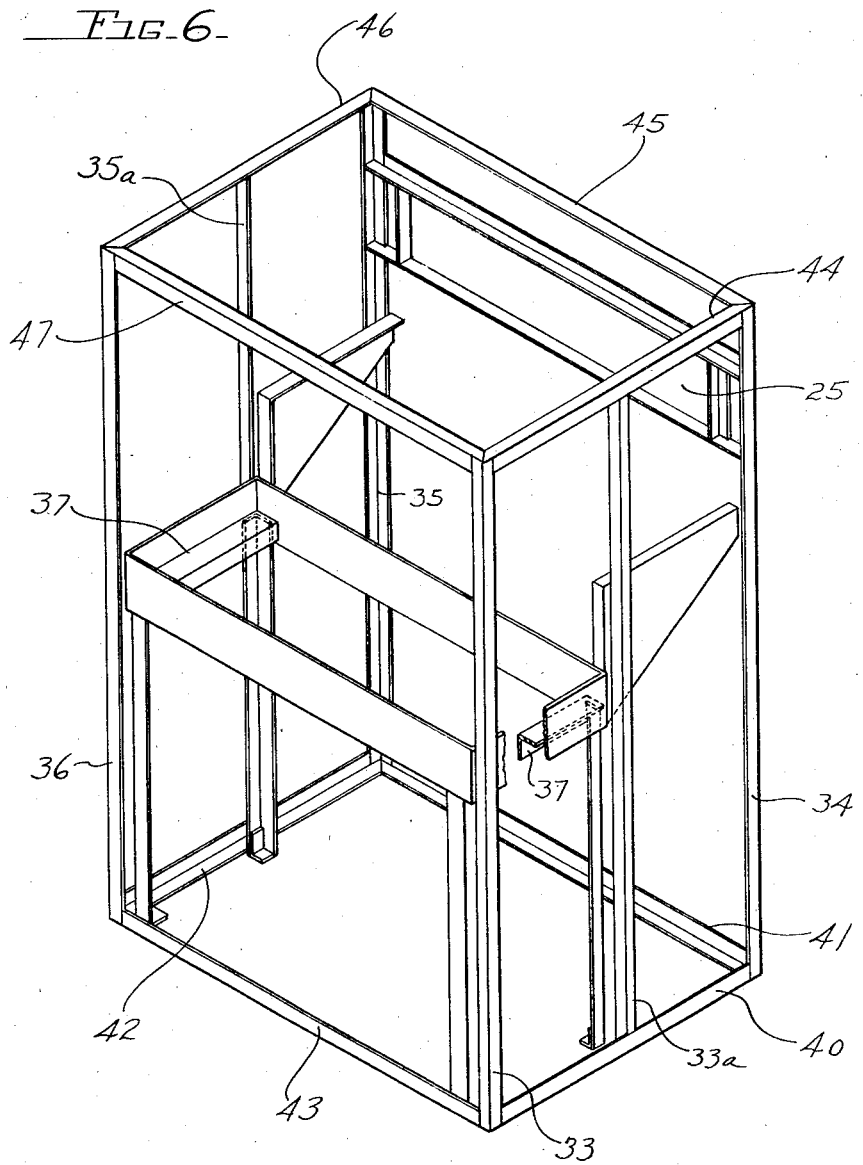

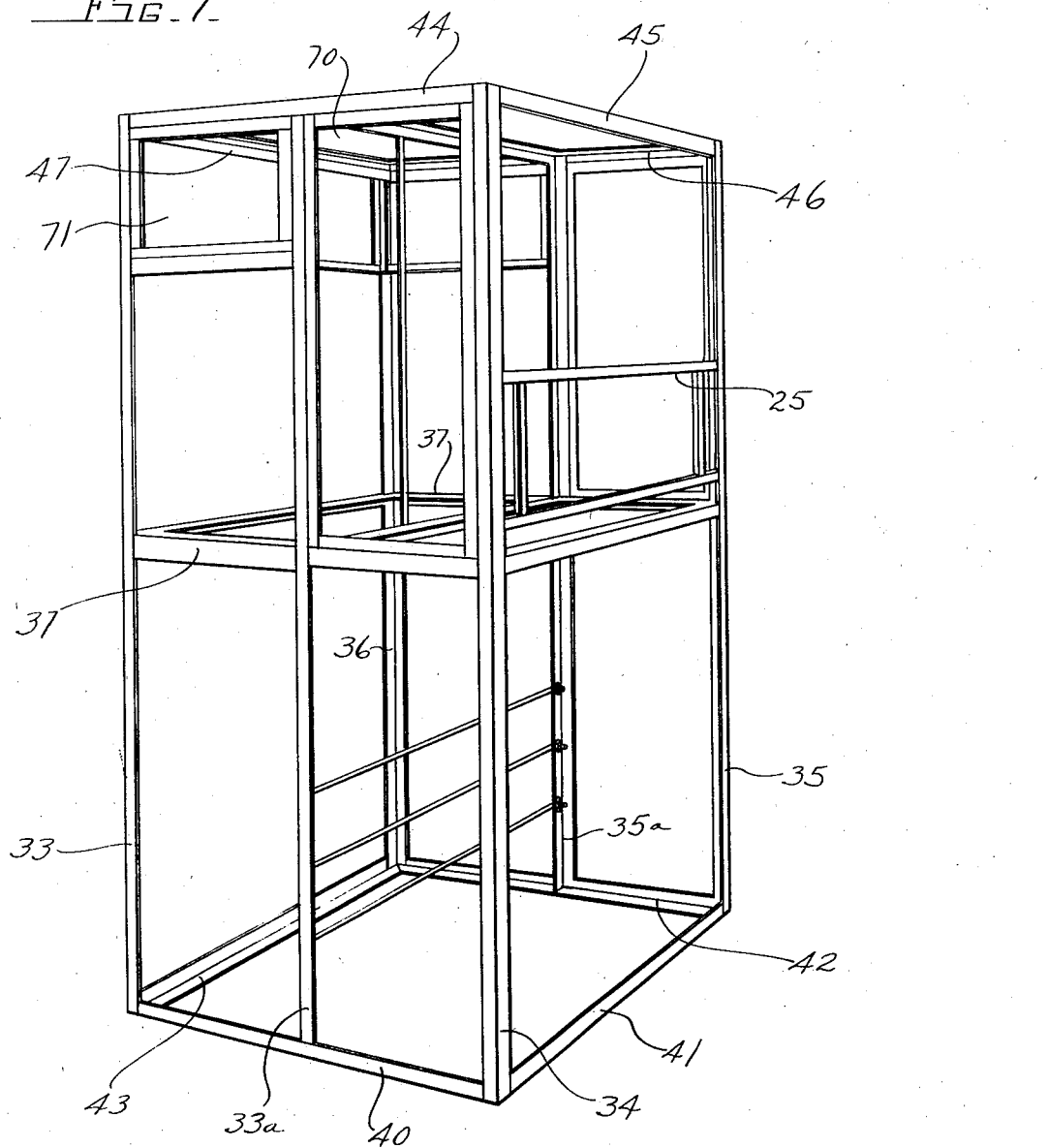

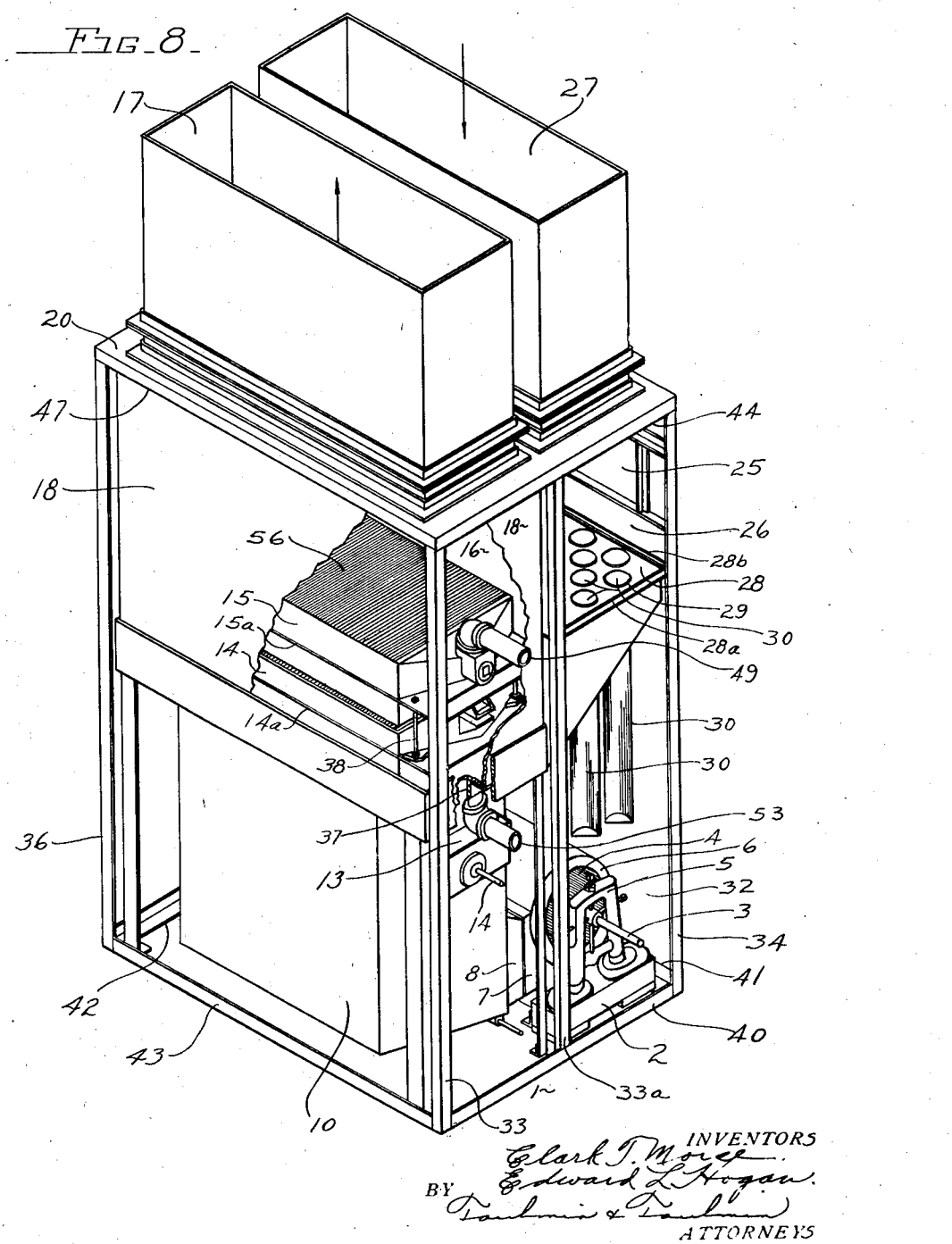

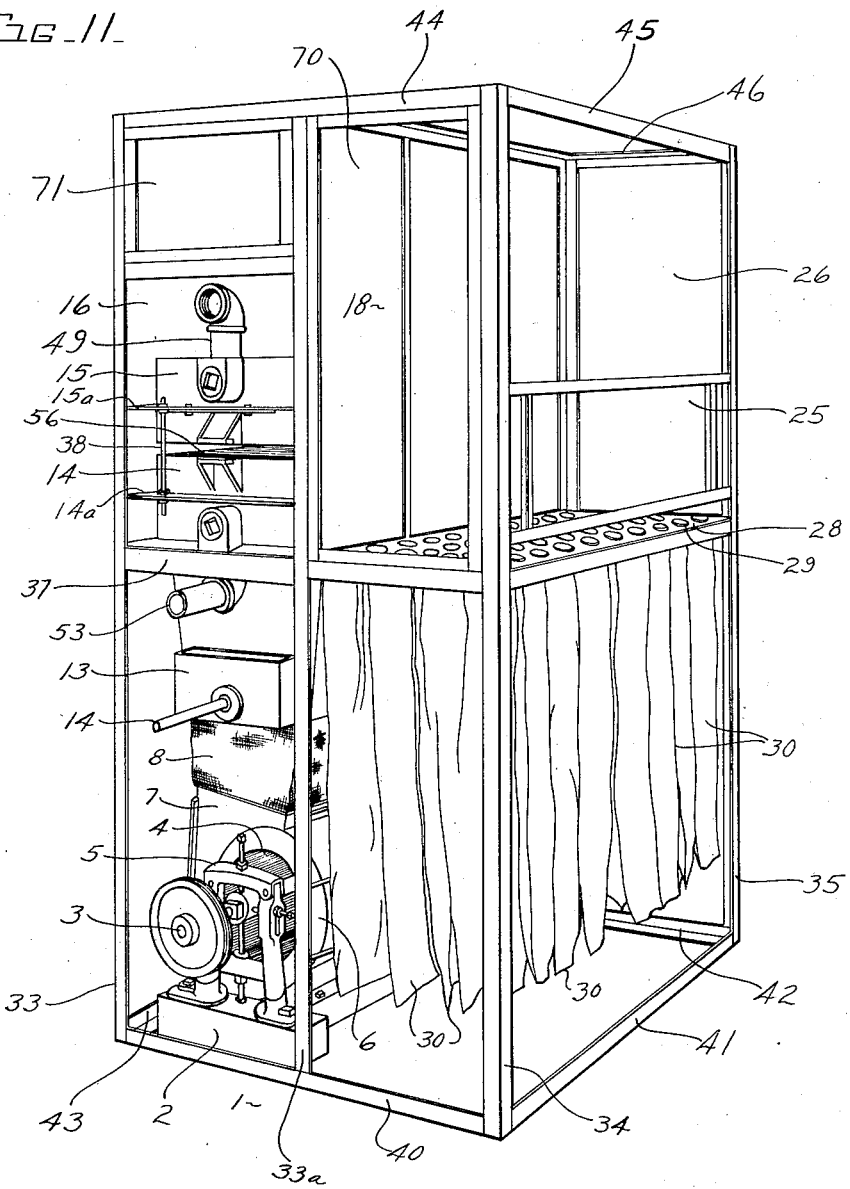

1,954,456

UNITED STATES PATENT OFFICE 1,954,456

AIR CONDITIONING APPARATUS

Clark T. Morse and Edward L. Hogan, Detroit, Mich., assignors to American Blower Corporation, Detroit, Mich., a corporation of Delaware Application April 1, 1932, Serial No. 602,412

17 Claims. (Cl. 257—137)

Our invention relates to air conditioning apparatus.

It is the object of our invention to provide a unitary apparatus in which any number of heating and cooling units and any number of filtering units can be employed in a unitary casing.

It is a further object to provide a combined heating and cooling unit with a system of pipes and valves which can be used for either heating or cooling without modification of the units.

It is a further object to provide a combination of heating radiators combining either a heating or a cooling medium in which the medium is so circulated as to secure the maximum amount of effect through the radiator.

In particular, it is the object of our invention to provide an outside casing, preferably of decorative character, having a plurality of separable sheets mounted on a frame and an interior independent frame work supporting an independent casing containing the heating and cooling unit and forming an air passageway over the unit and from the unit and a separable casing forming an air passageway to the heating and cooling unit.

It is an additional object to provide the maximum length of the air delivery passageway to the radiators with the blowers located to one side thereof on the floor of the building out of contact with the ornamental exterior casing and the interior casing delivering the air and directly beneath the filters.

It is a particular object of our invention to provide a vertical inlet direct into the filter chamber and a vertical outlet directly from the radiator chamber.

By having the casing so arranged vibration and noise is largely eliminated and by providing proper inlet doors, it is possible to have access to different parts of the cabinet for cleaning, repairing and adjustment without disturbing other parts of the cabinet. By having a vertical inlet and outlet, together with the peculiar arrangement of the parts within the cabinet, it is possible to have a relatively low cabinet capable of being connected as in a cellar directly to the inlet and outlet pipes immediately over the top of the cabinet, such pipes being the normal and usual ones found either in existing dwellings or in the new type of dwelling. Again, the advantage of the vertical inlet and outlet is shown as it is possible to discharge from the unit if placed in a room at the top thereof over the heads of the occupants and to bring about an even distribution of the conditioned air without directly blowing upon the occupants of the room.

By providing the arrangement as indicated in connection with the radiators, it is possible by the use of three valves to use the radiators, either for heating or cooling means and to provide the maximum circulation with the minimum of radiating surface thereby reducing very materially the cost of the unit, as a non-ferrous radiator usually employed is one of the most expensive items in connection with apparatus of this type.

We have thus provided a unitary assembly which can be expanded or reduced in size within a unitary casing so that any number of heating and cooling radiators may be employed or any number of filtering members; we have provided an internal frame work for supporting the operating mechanism so that any vibration therein will not be transmitted to the decorative casing on the exterior; we have provided the vibrating parts, such as the fan and fan casing with a foundation directly upon the floor of the building so that such vibration cannot be transmitted to any part of the unit.

By this arrangement of parts, it is possible to have a straight line flow of the incoming air through the filters with the maximum length of the filters to secure the maximum filtering capacity, which is a problem of the first magnitude in connection with the small air conditioning unit of this type.

We then provide for the air so filtered to pass directly into the eyes of the fans and to be discharged so that it will have a long straight line flow of sufficient length to provide for thorough distribution through the air inlet duct to the radiators for even distribution over the radiators. We provide for a straight line flow over the radiators and thence directly in a straight line out of the top of the unit so that minimum resistance will be set up. By doing this, we reduce our fan size and motor cost, also consumption of current.

Referring to the drawings:

Figure 1 is a perspective of the completed unit;

Figure 2 is a section on the line 2—2 thereof;

Figure 3 is a section on the line 3—3 of Figure 2;

Figure 4 is a section on the line 4—4 of Figure 3;

Figure 5 is a section on the line 5—5 of Figure 3;

Figure 6 is a perspective of the interior frame work and associated supporting mechanism;

Figure 7 is a perspective from the filter side showing the alternate form of construction.

Figure 8 is a perspective from the radiator side of the unit with the casing cover partially removed;

Figure 9 is a perspective of the heating boiler and of the air conditioning unit suitably interconnected by a pipe showing their relative relationship;

Figure 10 is a perspective of a heating and ventilating unit with side delivery and entrance openings at the top of the casing and with the side walls of the casing broken away to show an arrangement of parts by which the blower is placed directly beneath the radiator rather than beneath the air filtering mechanism;

Figure 11 is a perspective from the filtering side of the mechanism with the casing cover removed.

Referring to the drawings in detail, 1 indicates the floor upon which rests the fan and motor foundation 2 of wood or other similar resilient material, which will absorb the vibration of the motor and of the fans. The motor may be either mounted directly upon this cushion 2 or, as indicated in the drawings, it may be mounted on the floor 1 at some point remote or outside of the casing.

The motor or any other suitable source of motive power actuates the shaft 3 carrying the fan wheels 4, which shaft is supported on the brackets 5 mounted on the cushion supports 2.

These fan wheels are mounted within the fan scroll housing 6. They are designed to discharge air through the openings 7, the casing of textile material 8 and into the air inlet passageway chamber 9 formed by the casing 10.

In the path of the incoming air are baffle plates 11 which have their lower ends formed with troughs 12 for catching any precipitated moisture, which precipitant is led off to the trough 13 having the drain pipe 14 extending outside of the casing.

Above the chamber 9 are the radiators 14 and 15 over which the air is driven by the fans whence the air passes into the radiator chamber 16 and thence through an outlet tube 17 forming a passageway to the room to be treated by the air. The radiators are mounted within a supplementary interior casing 18 which overlaps the casing 10 and is telescopically arranged at its upper end as at 19 within the cover 20 which in turn supports the outlet passageway 17. This cover 20 rests upon the outside casing comprising the walls 21, 22, 23 and 24. This outside casing is independently supported upon the floor 1 so that the vibrations of the mechanism within the casing will not be directly communicated to it and thereby set up excessive vibrations which would be transmitted through the air delivery pipes to the building in which the apparatus is located.

The side wall 22 is provided with a door 25 to give access to the filter chamber 26, the top of which is supplied with air to an inlet tube 27 forming a passageway and the bottom of which is formed by the perforated plate 28 having openings 29 from which are suspended the filter bags 30.

A second door 31 is provided in the side wall 21 which gives access to the space 32.

The filter plate 28 with its supported bags 30, the air inlet chamber casing 10, the scrubber plates 11 and the radiators 14 and 15 are all supported by an internally-arranged frame work within the outside casing comprising the vertical frame members 33, 34, 35 and 36, and intermediate vertical frame members 33a and 35a. Transverse members 37 form a support for the radiators 14 and 15 which are interconnected to one another by the bolts 38. There are also provided transverse frame members 28a, 28b, 28c and 28d forming the support for the filter plate 28 on the vertical supports 33a, 34, 35 and 35a. Horizontal bottom frame members 40, 41, 42 and 43 tie the bottom of the vertical frame members 33, 33a, 34, 35, 35a and 36 together. These vertical members are likewise tied together at the top by horizontal frame members 44, 45, 46 and 47.

Thus, an interior frame work is provided which carries the filter in the air passageway casing, the radiators and the scrubber plates all independent of the outside decorative casing formed by the side wall plates 21, 22, 23 and 24. It is thus possible to manufacture and assemble or ship the interior parts without danger of injury of fine finish, they can be operated without danger of having the outside sheets 21, 22, 23 and 24 which are usually enamelled vibrated; and, by this arrangement, it is possible to use materials appropriate for the operative mechanism on the inside of the cabinet and materials appropriate, such as fine enamelled sheets, for the outside of the cabinet. The sheets themselves can be attached by suitable screws 39 to the frame work members 33, 34, 35 and 36.

These sheets are internally braced by the horizontally-disposed frame work designated 48 arranged to join the sections of the enamelled sheets together.

It is thus possible to build up the internal operating mechanism and place it directly on the floor 1 and then enclose it with decorative enamelled sheets 21, 22, 23 and 24 and an enamelled cover 20 without destroying the accessibility to the interior mechanism and permitting of the shipment as a separate unit of the fine finished enamelled sheets.

Referring to the details of construction of the radiator, it will be noted that the pipe 49 controlled by the valve 50 is the inlet pipe for either a heating or cooling medium, while the pipe 51 controlled by the valve 52 is the outlet for the heating medium, and pipe 53 controlled by the valve 54 is the outlet for the cooling medium. When the heating medium is being used valve 52 is opened and valve 54 is closed, and, when the cooling medium is being used, valve 52 is closed and valve 54 is opened.

As indicated in the drawings, there are two radiators 14 and 15 although there may be any number of such radiators as may be desired. These radiators are provided with sealing strips 14a and 15a so as to insure the passage of air through the radiators over the heating tubes 55 between the fins 56 mounted thereon. The radiators themselves are connected together by the interconnecting pipe 57. Any number of radiators may be employed.

As will be seen in Figure 5, the heating or cooling medium enters the header chamber 58 and passes through the opening 59 through the passageways 60 and 61 in the heating tubes 55, thence into the header chamber 62 back through the pipe passageways 63 and 64 into the header chamber 65 through the pipes 66 and 67 into the header chamber 68 and thence either out through the pipe 51 or down through the interconnecting pipe 57 into the radiator 14 which has a similar arrangement of passageways.

Above these radiators is a humidifier 69 which sprays water or steam into the outgoing air.

Figures 9, 10:
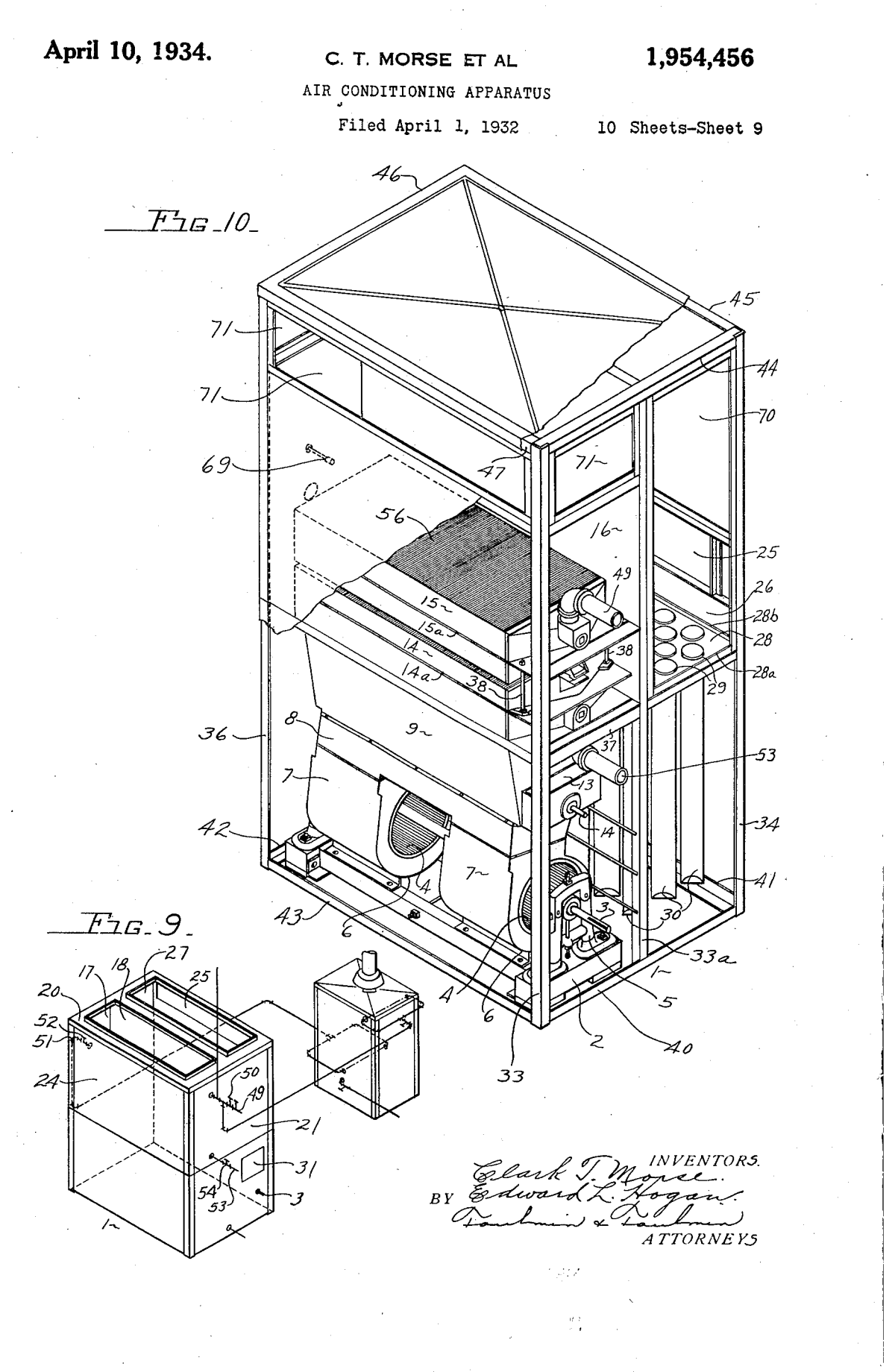

It will be noted in Figures 10 and 11 that the blower mechanism is located directly beneath the radiator. The air inlet in this casing is at 70, while the air outlet is at 71 so that the arrangement provides for a relatively low casing for installations where there is a low ceiling as in a cellar. Otherwise, the arrangement of the parts remain substantially the same.

However, in the construction shown in Figures 10 and 11, the radiators and filtering mechanism are directly supported upon the casing which acts as a support for the outside decorative sheets, whereas, in the form shown in Figures 1 to 6 inclusive, and 8, there is an interior supplementary support for supporting the radiators and associated mechanism.

It will be understood that we desire to comprehend within our invention such modifications as may be necessary to adapt it to varying conditions and uses.

Having thus fully described our invention, what we claim as new and desire to secure by Letters Patent, is:

1. In an air conditioning apparatus, a casing having in the cover thereof an air inlet and an air outlet arranged in parallel columns, filtering means depending along the axis of the air inlet, means therebelow to move air therethrough and discharge it into the adjacent column for upward movement, radiator means in the other column for changing the temperature of the air as it is discharged.

2. In an air conditioning apparatus, a casing having in the cover thereof an air inlet and an air outlet arranged in parallel columns, filtering means depending along the axis of the air inlet, means therebelow to move air therethrough and discharge it into the adjacent column for upward movement, radiator means in the other column for changing the temperature of the air as it is discharged, and means for humidifying the air as it is discharged over the radiator.

3. In an air conditioning apparatus, a unitary casing having an air inlet and an air exit opening at the top thereof divided by a partition having a bottom opening longitudinally arranged, filter means on one side of said casing, and transversely arranged temperature changing means on the other side of said partition, and a common means for moving the air through the filter means and over the temperature changing means, said air moving means being located directly on the floor on which said cabinet rests.

4. In an air conditioning apparatus, a casing having a vertical partition separating an air inlet compartment from an air outlet compartment, a perforated, transversely-arranged partition in the air inlet compartment having a plurality of depending, closed-end filter bags mounted therein, means of moving the air therethrough from one side of the partition to the other, radiator means on the other side of the partition from the filter bags arranged transversely of the casing, and means for conveying a temperature changing medium through said radiator.

5. In an air conditioning apparatus, a casing having a vertical partition separating an air inlet compartment from an air outlet compartment, a perforated, transversely-arranged partition in the air inlet compartment having a plurality of depending, closed-end filter bags mounted therein, means of moving the air therethrough from one side of the partition to the other, radiator means on the other side of the partition from the filter bags arranged transversely of the casing, comprising a plurality of radiators having a common inlet, and independent outlets depending upon whether a heating medium or cooling medium are to be used, said radiator system being capable of use with either type of medium.

6. In combination in an air conditioning apparatus of a casing having a frame work mounted upon the ground comprising an air discharge passageway mounted on said frame work, a fan mechanism mounted on the ground connecting to said casing, temperature changing means in said casing supported on said frame work, and a transverse partition having apertures therein mounted on said frame work supporting a plurality of filter bags, and an outside enclosing casing carrying inlet and outlet pipes communicating with the respective sides of one wall of said air passageway forming a partition.

7. In an air conditioning apparatus, an interior frame work for supporting a filter, air directing means and temperature changing means, an outside casing spaced therefrom enclosing the inside mechanism, and a fan resting directly on the ground adjacent the inside frame work and within said outside casing but disconnected therefrom.

8. In an air conditioning apparatus, a casing having an air inlet and air exit openings at the top, a partition vertically arranged extending downwardly from a point between said openings in the top of the casing to a point spaced from the bottom of the casing, relatively long, longitudinally-arranged filter bags arranged in parallel relationship on the inlet side of said partition, a fan therebelow resting on the floor and discharging air from one side of the casing partition to the other, and temperature changing means over which the air is adapted to flow mounted on the other side of the partition from the filter bags.

9. In an air conditioning apparatus, a casing having an air inlet and air exit openings at the top, a partition vertically arranged extending downwardly from a point between said openings in the top of the casing to a point spaced from the bottom of the casing, relatively long, longitudinally-arranged filter bags arranged in parallel relationship on the inlet side of said partition, a fan therebelow resting on the floor and discharging air from one side of the casing partition to the other, temperature changing means over which the air is adapted to flow mounted on the other side of the partition from the filter bags, and a decorative enclosing casing completely concealing said mechanism within it and supporting the air inlet and air outlet passageways.

10. In an air conditioning apparatus, a casing having an air inlet and air outlet openings at the top, a vertically-arranged partition spaced from the bottom of the casing, a plurality of filter bags depending in the inlet side of the casing, and a plurality of superimposed spaced relatively shallow horizontally-mounted radiators interconnected for the flow of a medium therethrough mounted on the other side of said partition, and means removing the air from one side of the partition to the other.

11. In an air conditioning apparatus, a casing having a vertically-arranged partition, filtering means on one side of the partition, an air chamber above said filter means, a fan below said filter means, an air discharge passageway on the other side of the partition, and a plurality of interconnected radiators mounted therein having reverse circulatory passageways therethrough.

12. In an air conditioning apparatus, a casing having a vertically-arranged partition, filtering means on one side of the partition, an air chamber above said filter means, a fan below said filter means, an air discharge passageway on the other side of the partition, a plurality of interconnected radiators mounted therein having reverse circulatory passageways therethrough, and means on one side of said radiators constituting an inlet and an outlet, and means on the other side of the radiators constituting an alternate outlet.

13. In an air conditioning apparatus, a casing having a vertically-arranged partition, filtering means on one side of the partition, an air chamber above said filter means, a fan below said filter means, an air discharge passageway on the other side of the partition, a plurality of interconnected radiators mounted therein having reverse circulatory passageways therethrough, and means on one side of said radiators constituting an inlet and an outlet, and means on the other side of the radiators constituting an alternate outlet for one of said radiators.

14. In an air conditioning apparatus, a frame having a vertical partition extending from the top to approximately halfway the bottom of the frame, an apertured transverse partition at the bottom of the vertical partition, and a plurality of filter bags suspended therefrom, radiator means horizontally disposed adjacent the bottom of the partition on the other side of the filter bags, and fan means resting on the floor independently of the frame work adapted to draw air through the filter bags and discharge it over the radiator.

15. In an air conditioning apparatus, a relatively narrow and tall casing having a vertically-disposed partition dividing the casing into two shallow vertical compartments communicating at the bottom, a pan at the bottom for moving the air from one side of the partition to the other, a filter on one side of the partition, and a radiator on the other side of the partition, said casing having an air inlet and an air outlet at the top thereof arranged in parallel relationship on opposite sides of the partition.

16. In an air conditioning apparatus, a casing having an inlet and an outlet opening, a partition extending from the top of the casing centrally thereof to a point midway of the casing, a filter supporting plate arranged transversely of the casing adjacent the bottom of the partition having a plurality of filter members depending therefrom to a point below the partition, an oppositely-disposed blower resting on the floor within the casing on which the casing is supported, a radiator above the blower between the walls of the casing and the partition, and means for directing the air from the blower over the radiator whereby filtered air is delivered through the filter near the bottom of the casing and is delivered from the blower from the bottom of the casing upwardly over the radiator out of the casing adjacent the top.

17. In an air conditioning apparatus, a casing having an inlet and an outlet opening, a partition extending from the top of the casing centrally thereof to a point midway of the casing, a filter supporting plate arranged transversely of the casing adjacent the bottom of the partition having a plurality of filter members depending therefrom to a point below the partition, an oppositely-disposed blower resting on the floor within the casing on which the casing is supported, a radiator above the blower between the walls of the casing and the partition, and means for directing the air from the blower over the radiator whereby filtered air is delivered through the filter near the bottom of the casing and is delivered from the blower from the bottom of the casing upwardly over the radiator out of the casing adjacent the top, said filter comprising a plurality of filtering bags depending vertically from a point at the bottom of the partition parallel thereto to a point adjacent the oppositely-disposed blower.

CLARK T. MORSE.
EDWARD L. HOGAN.